Patented June 25, 1940

2,205,886

UNITED STATES PATENT OFFICE 2,205,886

MATERIAL FOR THERAPEUTIC PURPOSES CAPABLE OF SWELLING IN WATER, AND METHOD OF PREPARING SAME

Karl Jungmann, Aussig, Czechoslovakia, assignor to Schering-Corporation, Bloomfield, N. J., a corporation of New Jersey No Drawing. Application July 1, 1937, Serial No. 151,454. In Germany July 11, 1936

6 Claims. (Cl. 167—56)

The present invention relates to the production of therapeutic substances capable of swelling in water but indigestible in nature and thus of value for the treatment of abnormal conditions of the alimentary tract.

Various substances having the capacity for swelling have been suggested for influencing the alimentary tract. Included among these there are particularly substances which are either incompletely digested or are wholly indigestible, for instance, agar-agar, pectin, and other substances. Their action is dependent on the fact that, because of their indigestibility, they reach the lowermost portions of the intestine.

In accordance with the present invention, substances having the quality of swelling are obtained, which have the advantage of a very high degree of smoothness and gliding quality as compared with known swelling substances. By virtue of their capacity to glide smoothly and easily, my new products act to prevent or alleviate irritation and inflammation.

According to my invention a gum which is insoluble in water but has the capacity of swelling in water and has markedly acid properties compared with other gums, such as a gum of the Bassora or Sterculia group, for example karaya or Indian kuteera gum and the like, is acted upon by alkalies, but only to such an extent that a 2% mixture in water yields a non-homogeneous slimy mass which in certain instances may be highly tenacious.

The at present preferred raw material is karaya gum, which term is used to signify substances from various sources having the capacity for swelling and characterized by their insolubility in water and their markedly acid properties compared with other gums. The present invention, however, contemplates the treatment of Bassora or Sterculia gums generally, such as are obtained from plants of the genus Sterculia, like the various types of Indian gum from the plant *Prosopis spicigera* L., *Feronia limonia* R., and *Anogeissus latifolia* C., and the kuteera gum from *Sterculia ureus*.

The products obtained according to the process of the present invention on swelling acquire a high degree of smoothness and gliding action, which properties are absent in the original gum. It should, however, be noted that in spite of the chemical action on the gum it remains indigestible or only partially digestible. Also, the original acidity of the gum is reduced by the treatment with the alkaline material.

The particular manner of treatment with the alkaline compound is in itself immaterial. Treatment with ammonia and other volatile alkalies has been found particularly suitable. The alkaline treatment may be conducted in aqueous dispersion, but it is preferably carried out in a non-aqueous phase, for instance, in alcohol. I have found further that the modification of the starting material may also be carried out by the action of alkaline gases or vapors on the dry gum.

For instance, the substance having capacity for swelling, after being suitably comminuted, is placed on sieves or cloths in a reaction chamber into which ammonia or ammonia derivatives, such as amines, are conducted or are developed from aqueous solution. It is also possible to carry out the procedure by having the ammonia solution absorbed by a small portion of the gum and then thoroughly mixing this portion with the balance of the gum, so that an alkaline atmosphere is produced upon liberation of the gaseous ammonia from the granules into which it had previously been absorbed. After removal from the reaction chamber and evaporation of the adherent alkali it is free from foreign substances. Moreover, the subsequent removal of large amounts of water which is necessary when working in an aqueous phase becomes unnecessary by these modes of procedure.

All of the processes are hastened by carrying them out at elevated temperatures. The action may be regulated by varying the amount of alkali used as well as the duration and temperature treatment. It may also be interrupted by the addition of acid, or by the introduction of air, the latter when volatile alkaline agents are employed. It is advisable to determine, by sampling, the necessary reaction conditions, such as time and temperature, for obtaining a gum of which a 2% mixture in water on swelling yields a non-homogeneous slimy mass which may still contain granules in swelled condition.

Those modes of procedures whereby a product is formed of which a 2% mixture in water on swelling produces a homogeneous mass are not within the limit of the present invention.

As fine grinding affects unfavorably the properties and the action of the material produced by the process previously described, the size of the granules should be under sieve 70 (width of opening 0.21 mm.), preferably under sieve 40 (width of opening 0.45 mm.).

The indigestibility of the gum is maintained practically unimpaired by my treatment. The gum partially modified in this manner has absorbing as well as adsorbing properties, and because of the slimy smoothness of the product obtained on swelling in water, it is particularly suited for the production of bulk laxatives, antidiarrheics and other preparations useful for treating conditions of the alimentary tract. It is effective in itself and may also be used as a vehicle for medicinals.

The following examples may serve to illustrate the process of the present invention without, however, limiting the same to them.

Example 1

4 kg. ground karaya gum is added to 10 l cold water while rapidly stirring, whereafter the suspension is poured at once into 90 l hot water of 80° C. containing 450 ccs. concentrated ammonia solution. The modification of the stirring material is observed by examining small samples. After 4 hours in most of the cases the action can be stopped. Then a 10% lactic acid solution is added while stirring until the mixture shows an acid reaction when litmus is applied. The water is eliminated by carefully drying the reaction product in vacuum.

Example 2

4 kg. Indian tragacanth are mixed with 10 l cold water containing 200 g. tri-sodium-phosphate. After the reaction mixture has been allowed to stand for 12 hours the non-homogeneous slimy mass formed is acidified by means of citric acid until the mixture shows an acid reaction. The slimy mass is then dried and ground.

Example 3

10 kg. ground karaya gum which has been sifted by using sieves having a width of opening of 1.1 mm. and 2.9 mm. respectively is heated in a rotating iron drum to a temperature of 60–70° C. Into the drum ammonia is caused to stream from a gas flask. Before streaming in the ammonia is passed through a flask containing boiling water. 0.3 kg. ammonia gas is caused to stream into the rotating drum within 45 minutes. The amount of water carried by the ammonia gas during this period of streaming in is about 150 ccs. After the reaction is finished the granulous material is shot from the drum and the ammonia adhering thereto removed by blowing air through the mixture.

Example 4

A cup with 1 l concentrated ammonia solution is placed below a pot having a sieve-bottom and containing 10 kg. ground Sterculia gum which is sifted by using sieves having a width of opening of 0.6 mm. and 1.1 mm. respectively. The mass is warmed to 35–40° C. for about 12 hours. Thereupon the reaction product is shot on a surface as large as possible and freed from the alkaline agents adhering thereto by allowing the product to lie in the open air for 2 days.

Of course, various modifications and changes in the reaction conditions, etc., may be made by those skilled in the art in accordance with the principles set forth herein and in the claims annexed hereto.

What I claim is:

1. Process for the production of a laxative agent of the swelling type which comprises subjecting karaya gum to a limited modification by gaseous ammonia in the proportion of about 0.3 kg. to 10 kg. of ground gum at a temperature of about 60–70° C. for about 45 minutes, the treatment being discontinued when a product is obtained which is still substantially indigestible and insoluble in water but which in a 2% mixture in water yields a non-homogeneous, slimy, easily gliding mass.

2. A dry granular bulk laxative comprising a water-insoluble alkali-modified gum prepared from a member of the group consisting of Bassora and Sterculia gums, said modified gum retaining the normal capacity of the natural gums of swelling to many times its dry volume when in contact with water and of remaining non-homogeneous in such swollen condition, said modified gum having a lower acidity than the natural gum and being in its swollen condition substantially indigestible and slimy while passing through the intestinal tract.

3. A process for preparing a bulk laxative of improved smoothness and gliding characteristics and freedom from irritation from a water-insoluble, indigestible gum selected from the group consisting of Bassora and Sterculia gums, comprising reacting said gum in water with an alkaline agent, stopping said alkaline treatment when a partially modified gum is obtained which is still substantially water-insoluble and indigestible but which has a lower acidity than the natural gum, and drying the partially modified product to produce a gum which swells on contact with water to form a swollen, slimy and easily gliding non-homogeneous mass.

4. Process according to claim 3, wherein the partially reacted gum is treated with an organic acid before drying.

5. A process for preparing a bulk laxative of improved smoothness and gliding characteristics and freedom from irritation from a water-insoluble, indigestible gum selected from the group consisting of Bassora and Sterculia gums, comprising reacting said gum in the substantially dry condition with a volatile alkaline agent, and stopping the alkaline treatment when a partially modified gum is obtained which is still substantially water-insoluble and indigestible but which has a lower acidity than the natural gum and is capable of swelling on contact with water to form a swollen, slimy and easily gliding non-homogeneous mass.

6. Process according to claim 5, wherein the volatile alkaline agent is ammonia vapor.

KARL JUNGMANN.